United States Patent
Lee

(10) Patent No.: US 10,471,844 B2
(45) Date of Patent: Nov. 12, 2019

(54) ELECTRIC VEHICLE AND BATTERY CHARGING METHOD OF THE SAME

(71) Applicants: HYUNDAI MOTOR COMPANY, Seoul (KR); KIA MOTORS CORPORATION, Seoul (KR)

(72) Inventor: Ki Chang Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 106 days.

(21) Appl. No.: 15/722,959

(22) Filed: Oct. 2, 2017

(65) Prior Publication Data

US 2018/0272878 A1    Sep. 27, 2018

(30) Foreign Application Priority Data

Mar. 24, 2017    (KR) .................... 10-2017-0037431

(51) Int. Cl.
*B60L 53/00*    (2019.01)
*B60H 1/00*    (2006.01)
*B60L 53/66*    (2019.01)
*B60L 53/30*    (2019.01)

(52) U.S. Cl.
CPC .......... *B60L 53/00* (2019.02); *B60H 1/00392* (2013.01); *B60H 1/00735* (2013.01); *B60H 1/00778* (2013.01); *B60L 53/305* (2019.02); *B60L 53/665* (2019.02); *Y02T 10/7005* (2013.01); *Y02T 10/7088* (2013.01)

(58) Field of Classification Search
CPC .............. B60L 11/1809; B60L 11/1848; B60L 2230/16; B60H 1/00735; Y02T 10/7005; Y02T 10/7088
USPC ........................................................ 701/22
See application file for complete search history.

(56) References Cited

U.S. PATENT DOCUMENTS

| | | | |
|---|---|---|---|
| 9,114,686 B2 * | 8/2015 | Hashigaya | B60H 1/00428 |
| 2002/0113576 A1 * | 8/2002 | Oomura | B60H 1/004 320/134 |
| 2012/0101659 A1 * | 4/2012 | Kim | B60H 1/00257 701/2 |
| 2013/0291577 A1 * | 11/2013 | Miyakoshi | B60H 1/00392 62/151 |
| 2015/0316389 A1 * | 11/2015 | Inoue | B60L 11/1838 701/521 |
| 2015/0336560 A1 * | 11/2015 | Shigyo | B60W 20/10 701/22 |

(Continued)

FOREIGN PATENT DOCUMENTS

| | | |
|---|---|---|
| JP | 2012-244784 A | 12/2012 |
| JP | 2014-134456 A | 7/2014 |

(Continued)

*Primary Examiner* — Anne M Antonucci
*Assistant Examiner* — James E Stroud
(74) *Attorney, Agent, or Firm* — Morgan, Lewis & Bockius LLP

(57) ABSTRACT

A method of charging the battery of the vehicle includes starting charging of the battery; starting operation of an air conditioner using power supplied from the battery; and reducing an operation amount of the air conditioner while charging the battery and operating the air conditioner, thereby shortening the time required for charging the battery.

17 Claims, 6 Drawing Sheets

(56) References Cited

U.S. PATENT DOCUMENTS

| | | | |
|---|---|---|---|
| 2015/0338225 A1* | 11/2015 | Suzuki | G01C 21/3469 |
| | | | 701/527 |
| 2016/0023562 A1* | 1/2016 | Parra Ortiz | B60L 11/1824 |
| | | | 320/109 |
| 2016/0207414 A1* | 7/2016 | Watanabe | B60L 1/003 |
| 2016/0264013 A1* | 9/2016 | Kim | B60L 11/1848 |
| 2017/0282744 A1* | 10/2017 | Koo | B60K 37/02 |
| 2018/0029500 A1* | 2/2018 | Katanoda | B60W 20/11 |
| 2018/0141555 A1* | 5/2018 | Jung | B60W 30/1886 |
| 2018/0154793 A1* | 6/2018 | Jun | B60H 1/00742 |
| 2018/0236898 A1* | 8/2018 | Ji | B60L 15/2045 |

FOREIGN PATENT DOCUMENTS

| | | |
|---|---|---|
| KR | 10-2012-0041066 A | 4/2012 |
| KR | 10-2013-0048383 A | 5/2013 |

\* cited by examiner

ELECTRIC VEHICLE AND BATTERY CHARGING METHOD OF THE SAME

CROSS-REFERENCE TO RELATED APPLICATION

This application claims the benefit of Korean Patent Application No. 10-2017-0037431, filed on Mar. 24, 2017 in the Korean Intellectual Property Office, the disclosure of which is incorporated herein by reference.

BACKGROUND

1. Technical Field

The present disclosure relates to an electric vehicle, and more particularly to charging a battery of a plug-in electric vehicle (PEV) or to charging a plug-in hybrid electric vehicle (PHEV). In the present disclosure, both the plug-in electric vehicle (PEV) and the plug-in hybrid electric vehicle (PHEV) are collectively referred to as electric vehicles.

2. Description of the Related Art

A vehicle may be divided into an internal combustion engine vehicle, a hybrid electric vehicle, and a pure electric vehicle depending on the type of a power source generating driving force. Internal combustion engine vehicles burn fossil fuels to generate the driving power, and are currently the most popular form of vehicles. Hybrid electric vehicles and pure electric vehicles are being developed to solve the problem of the exhaustion of fossil fuels used as fuel for internal combustion engines and environmental pollution. The penetration rate of hybrid electric vehicles and pure electric vehicles is gradually increasing.

Hybrid electric vehicle includes both a motor and an internal combustion engine, and drives the motor by charging a battery using the driving force of the internal combustion engine or the regenerative energy generated during braking. That is, the first type of the hybrid electric vehicle charges the battery with electric power generated internally without receiving power from the outside.

Pure electric vehicles are also being developed and distributed in various types. Hydrogen electric vehicles charge a battery with electricity generated from a chemical reaction of hydrogen and oxygen, and drive the motor with electricity of the battery. The hydrogen electric vehicles do not charge batteries with external electricity because the hydrogen electric vehicles use hydrogen as fuel to generate electricity. Another type of pure electric vehicle is a plug-in electric vehicle (PEV) having a battery charged by external electric power and a motor driven by the charging power of the battery. The plug-in electric vehicles do not use fuel such as hydrogen, but use only electricity as energy.

Both the plug-in electric vehicles (PEVs) and the plug-in hybrid electric vehicles (PHEVs) have batteries to supply electric power to the motor. The battery may be plug-in-charged by connecting the plug of the home or charging station to the charge terminal of the plug-in electric vehicles (PEVs) and the plug-in hybrid electric vehicles (PHEVs). The plug-in electric vehicles (PEVs) and the plug-in hybrid electric vehicles (PHEVs) may not be able to travel to a destination unless the battery is sufficiently charged. Therefore, fully charging the battery prior to traveling is very important.

SUMMARY

An object of embodiments of the present disclosure is for efficiently charging a battery within a given time prior to the traveling of an electric vehicle.

In accordance with an aspect of the present disclosure, a method of charging a battery of a vehicle, includes: starting charging of the battery; starting operation of an air conditioner using power supplied from the battery; and reducing an operation amount of the air conditioner while charging the battery and operating the air conditioner, thereby shortening the time required for charging the battery.

The battery is charged up to a target charge amount necessary for the vehicle to travel to a destination.

The operation amount of the air conditioner is reduced by adjustment of a set temperature of the air conditioner.

The adjustment of the set temperature of the air conditioner includes: calculating a possible charging time from a difference between a scheduled departure time and a current time; calculating a total amount of supplying power from a product of a charge power per hour and the possible charging time; calculating an amount of available supply power for the air conditioner from a difference between the total amount of supplying power and a required battery charging amount; and calculating a new set temperature of the air conditioner capable of charging the battery before the scheduled departure time, wherein the new set temperature of the air conditioner is calculated from the amount of available supply power.

The charging of the battery and the operation of the air conditioner are performed in response to a charging command and an air conditioning operation command that occurs before the scheduled time of the vehicle.

In accordance with another aspect of the present disclosure, a vehicle includes: a battery; an air conditioner operated by power supplied from the battery; and a controller reducing an operation amount of the air conditioner while charging the battery and operating the air conditioner, thereby shortening the time required for charging the battery.

The battery is charged up to a target charge amount necessary for the vehicle to travel to a destination.

The operation amount of the air conditioner is reduced by adjustment of a set temperature of the air conditioner.

The controller controls: calculating a possible charging time from a difference between a scheduled departure time and a current time; calculating a total amount of supplying power from a product of a charge power per hour and the possible charging time; calculating an amount of available supply power for the air conditioner from a difference between the total amount of supplying power and a required battery charging amount; calculating a new set temperature of the air conditioner capable of charging the battery before the scheduled departure time, wherein the new set temperature of the air conditioner is calculated from the amount of available supply power; and adjusting the set temperature of the air conditioner based on the new set temperature of the air conditioner.

The charging of the battery and the operation of the air conditioner are performed in response to a charging command and an air conditioning operation command that occurs before the scheduled time of the vehicle.

In accordance with another aspect of the present disclosure, a method of charging a battery of a vehicle includes: receiving a scheduled time and a destination of the vehicle, and a set temperature of the air conditioner; displaying a present charge amount of the battery and the set temperature of the air conditioner on a display; displaying a new set temperature of the air conditioner on the display, wherein the new set temperature of the air conditioner is for charging the battery up to a target amount of charge required for the vehicle to travel to the destination before the scheduled time of the vehicle during charging of the battery and operation of the air conditioner, thereby shortening the time required for charging the battery, and controlling the charging of the battery so that the battery is charged to the target charging amount before the scheduled driving time of the vehicle while operating the air conditioner to follow the new set temperature of the air conditioner displayed on the display.

The scheduled driving time and destination of the vehicle and the set temperature of the air conditioner are set by a user of the vehicle through a mobile device.

The scheduled driving time and destination of the vehicle are received from a schedule guidance service based on wired or wireless communication.

The set temperature of the air conditioner is acquired by analyzing a use history of the air conditioner.

The set temperature of the air conditioner is acquired by analyzing a weather history of a departure area of the vehicle.

The battery is charged up to a target charge amount necessary for the vehicle to travel to a destination.

The charging of the battery and the operation of the air conditioner are performed in response to a charging command and an air conditioning operation command that occurs before the scheduled time of the vehicle.

The method further includes obtaining approval from a user of the vehicle to change the set temperature of the air conditioner to the new set temperature of the air conditioner.

The method further includes generating an alarm to inform the user that the amount of charge of the battery may be insufficient, when the user's approval for changing the new set temperature of the air conditioner is not obtained.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
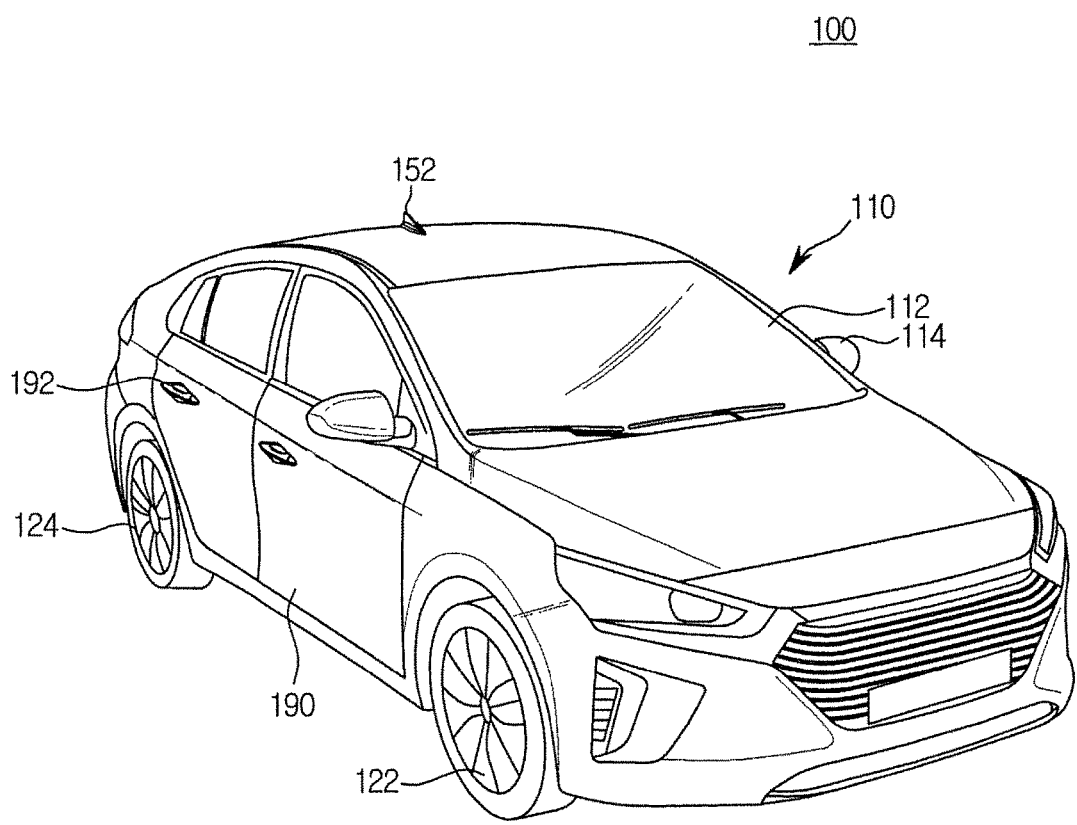
FIG. 1 is a diagram illustrating an electric vehicle according to an embodiment of the present disclosure.

In the description of the present disclosure, embodiments shown in the drawings are preferred examples of the disclosed invention, and there can be various modifications that can replace the embodiments and the drawings of the present disclosure at the time of filing of the present disclosure.

FIG. 1 is a diagram illustrating an electric vehicle according to an embodiment of the present disclosure. A vehicle 100 shown in FIG. 1 is an electric vehicle that drives a motor using electric energy.

As shown in FIG. 1, the vehicle 100 is formed with an outer appearance by a main body 110. A windshield 112 is provided on the front side of the main body 110. The windshield 112 provides an occupant of the vehicle 100 with a front view, and protects an occupant from wind, obstacles, or the like. An outside mirror 114 may be provided for each of left and right doors 190. The outside mirror 114 provides an occupant with a view of the left and right sides of the vehicle 100.

The door 190 is provided so as to be openable/closable on the left and right sides of the main body 110, respectively. The door 190 allows an occupant to enter and exit the vehicle in the open state. When the door 190 is closed, the inner space of the vehicle 100 is isolated from the outside and protected. The door 190 is locked/unlocked through a door locking device 192. The locking/unlocking of the door locking device 192 is performed by directly operating a button or a lever of the door locking device 192 or by using a remote controller.

An antenna 152 is for receiving telematics signals and broadcasting/communication signals such as DMB, digital TV, and GPS. The antenna 152 may be a multifunctional antenna for receiving various kinds of broadcast/communication signals or a single functional antenna for receiving any one of broadcast/communication signals.

A front wheel 122 and a rear wheel 124 are located in front of and rear of the electric vehicle 100, respectively, and rotated by the power provided from a motor (not shown).

Figure 2:
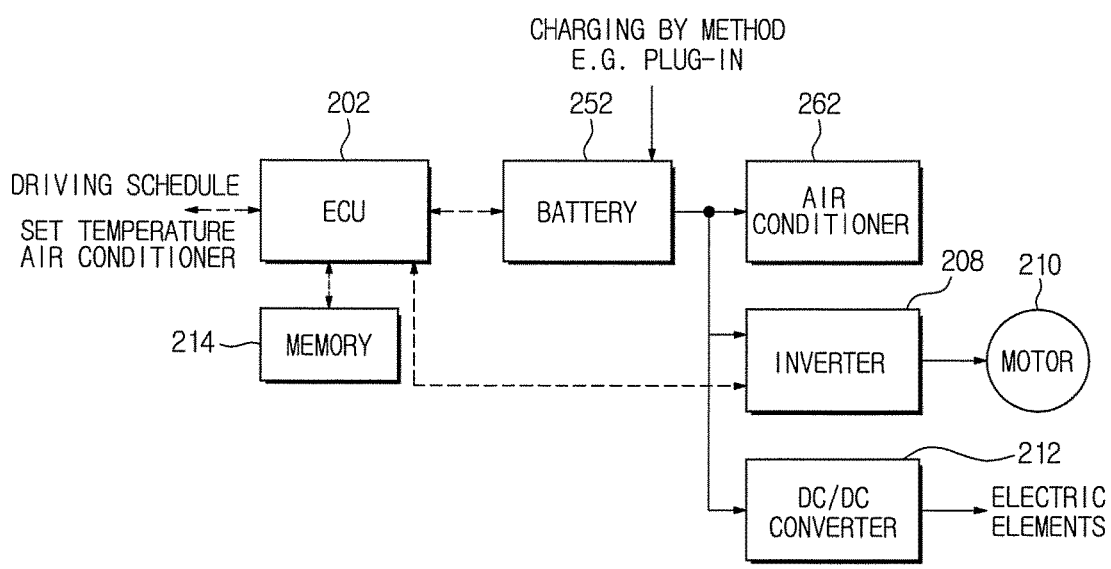
FIG. 2 is a diagram illustrating a power system of the electric vehicle according to an embodiment of the present disclosure.

FIG. 2 is a diagram illustrating a power system of the electric vehicle according to an embodiment of the present disclosure. In FIG. 2, an ECU (Electronic Control Unit) 202 is a controller for controlling the overall operation of the power system. Alternatively, the ECU 202 may be a controller of a battery management system (BMS) that controls and manages the charging and discharging of a battery 252. In the embodiment of the present disclosure, the ECU 202 reduces power consumption of an air conditioner 262 by adjusting a set temperature (target temperature) of the air conditioner 262 according to a driving schedule of the electric vehicle 100 and state of charge (SOC) of the battery 252. As the power consumption of the air conditioner 262 decreases, the power consumption of the battery 252 also decreases. When the power consumption of the battery 252 is reduced, the time required to charge the battery 252 is shortened. As a result, the battery 252 may be charged to the target charge amount within a shorter time by reducing the power consumption of the air conditioner 262.

The SOC represents a current state of charge of the battery 252 in percentage (%), which is the same concept as a fuel gauge of a vehicle equipped with an internal combustion engine.

In FIG. 2, dashed arrows between the ECU 202, the battery 252, an inverter 208, and a memory 214 indicate the flow of control signals transmitted through the CAN (Control Area Network). Also, in FIG. 2, solid arrows between the battery 252, the inverter 208, a DC/DC converter 212, a motor 210, and the air conditioner 262 indicate the electric power supplied from the battery 252.

The battery 252 is charged by the electric power supplied from the outside through e.g. a plug-in method. The electric power charged in the battery 252 is used as driving energy for the motor 210.

The inverter 208 converts a voltage of the battery 252 into multi-phase AC power (for example, three-phase AC power of U, V, W) and supplies the converted voltage to the motor 210. For the converting of the voltage, a control signal for controlling the converting of the multi-phase AC power is applied to the inverter 208.

The motor 210 is driven by the multi-phase AC power of the inverter 208 and generates a rotational force. The rotational force of the motor 210 is used to rotate the front wheel 122 or the rear wheel 124 of the electric vehicle 100.

The DC/DC converter 212 boosts or reduces the DC power supplied from the battery 252 to a predetermined level. DC power outputted from the DC/DC converter 212 is supplied to various electric elements (for example, lights, an ECU, a multimedia device) provided in the electric vehicle 100.

The memory 214 is for storing data or software/firmware required for the ECU 202 to perform the control. In particular, the memory 214 may store a schedule of the electric vehicle 100, the set temperature of the air conditioner 262, and the SOC of the battery 252.

The air conditioner 262 is for cooling or heating the passenger room of the electric vehicle 100. For cooling, the air is cooled through a general refrigerant cycle including a compressor, a condenser, an evaporator, and an expansion valve, and is blown into the passenger room. In a vehicle using an internal combustion engine, heated air is generated by the internal combustion engine to heat the passenger room. On the other hand, in the electric vehicle 100 not using an internal combustion engine, a heating coil is used to heat the air for heating, and the heated air is blown into the passenger room. In the electric vehicle 100, the electric power of the battery 252 is used for cooling and heating. Therefore, in the electric vehicle 100, more electric power of the battery 252 is consumed for cooling or heating.

Figure 3:
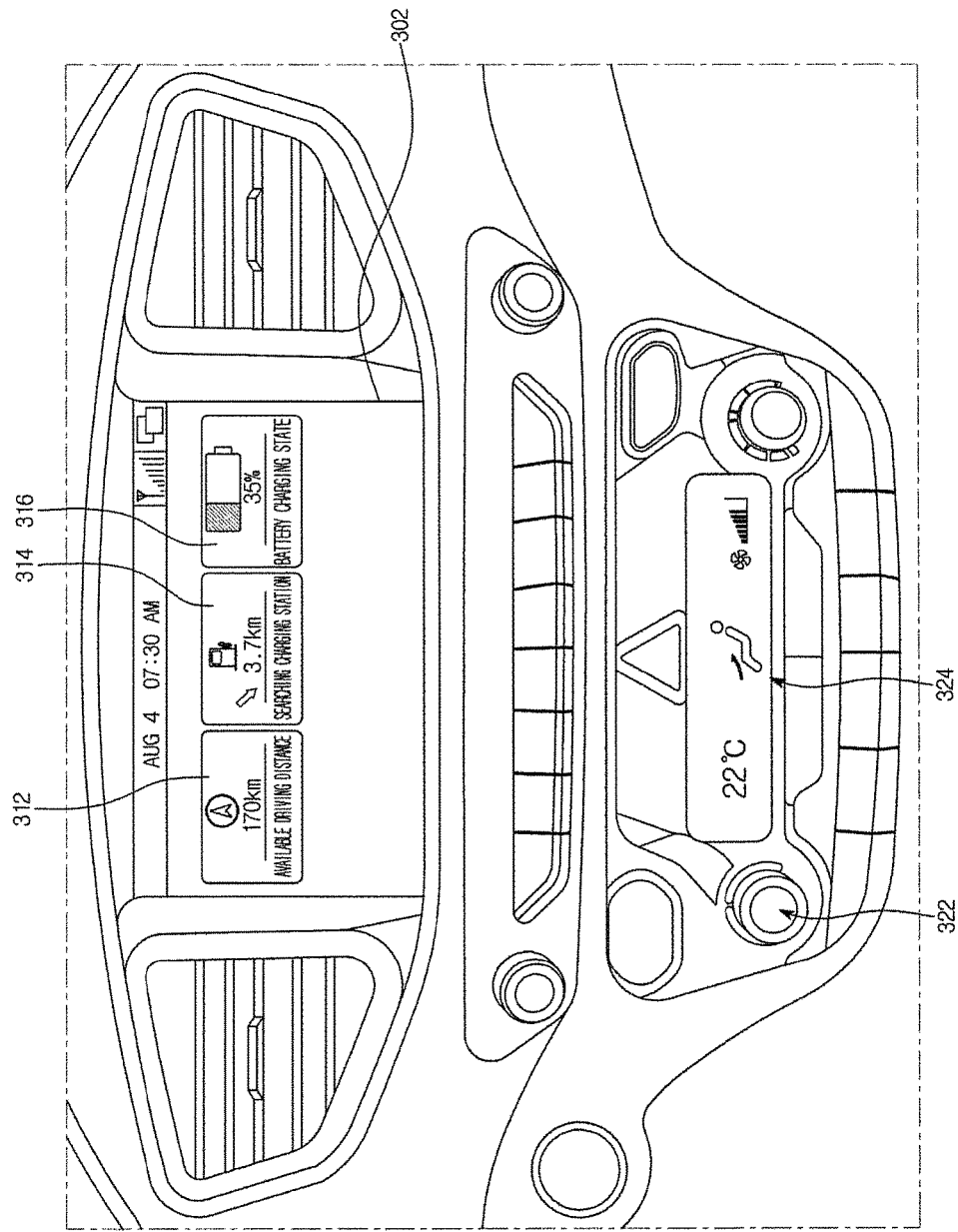
FIG. 3 is a diagram illustrating an interior of the electric vehicle according to an embodiment of the present disclosure.

FIG. 3 is a diagram illustrating an interior of the electric vehicle according to an embodiment of the present disclosure. A plurality of displays 302 and 324 are provided on the front surface of the interior of the electric vehicle 100 for displaying various information on the current state of the electric vehicle 100 (for example, display of a navigation, an audio, an air conditioner, etc.).

The display 302 displays an available driving distance 312 of the electric vehicle 100, a searching charging station 314 and a battery charging state 316 to display information required for operating the battery 252 of the electric vehicle 100 to a user. The available driving distance 312 is a maximum distance at which the electric vehicle 100 can travel at the current charged amount of the battery 252. The searching charging station 314 guides the location of the electric charging station located in the vicinity of the electric vehicle 100. The battery charge state 316 is a percentage (%) of the SOC of the battery 252.

The display 324 displays a set temperature (target temperature) of the air conditioner 262, an air blowing mode, and a speed of a blowing fan. An air conditioning dial 322 is for manually setting on/off and the target temperature of the air conditioner 262.

Figure 4:
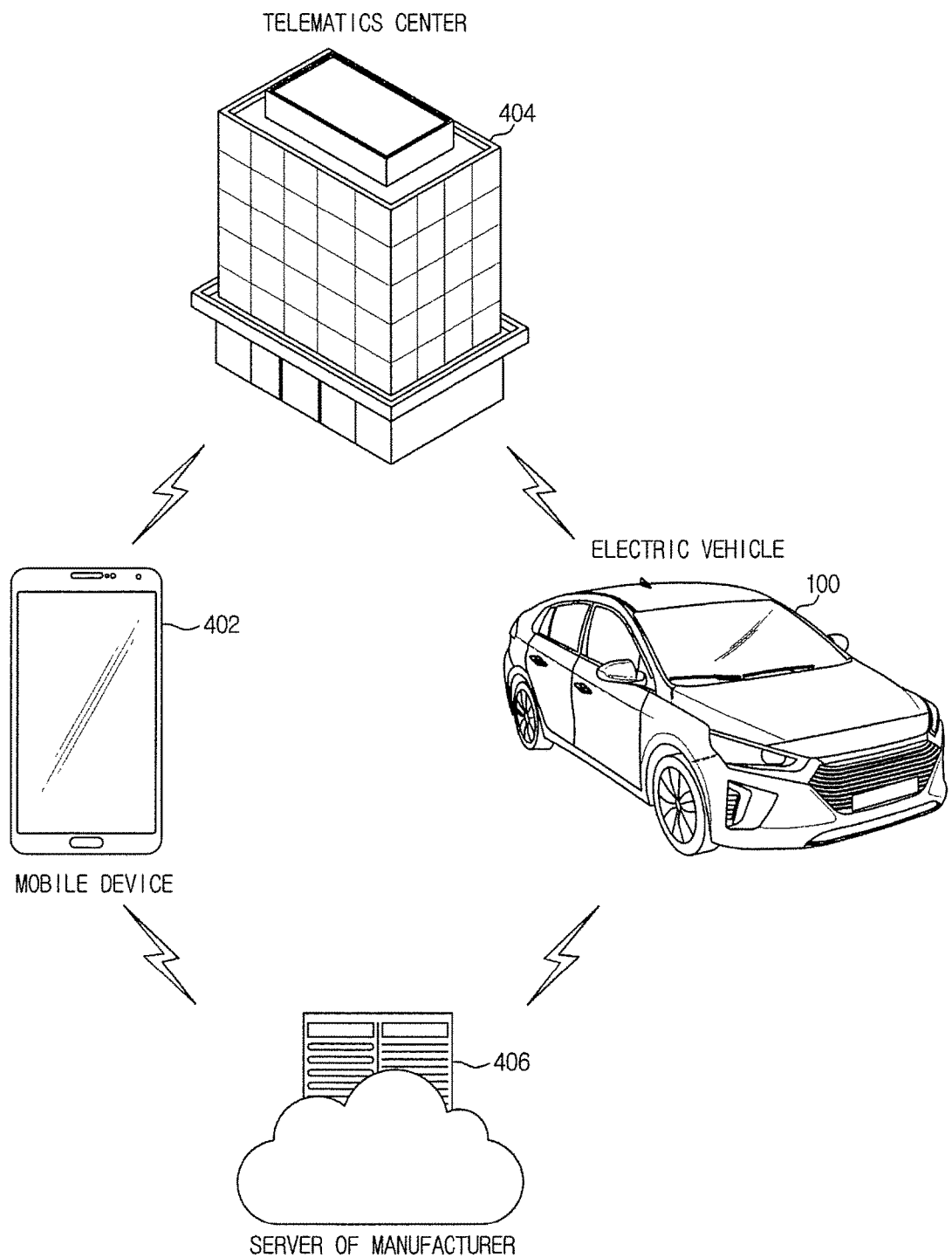
FIG. 4 is a diagram illustrating a flow of wireless communication for the remote control of the electric vehicle according to an embodiment of the present disclosure.

FIG. 4 is a diagram illustrating a flow of wireless communication for the remote control of the electric vehicle according to an embodiment of the present disclosure. In the electric vehicle 100 according to the embodiment of the present disclosure, the user may set various functions of the electric vehicle 100 located at a remote place in a desired state by using a mobile device 402. Wireless communication between the user's mobile device 402 and the electric vehicle 100 may be performed via a telematics center 404 or via a server 406 of the vehicle manufacturer. An example of items and methods that the user may set at a remote location using the mobile device 402 is as follows.

<Setting a Destination>

The user may set a destination of the electric vehicle 100 through an application (so-called 'App') installed in the mobile device 402. The set destination may be used for route guidance of the navigation. The setting of the destination may include setting of a starting position (origin). When the setting of the destination is for route guidance of the navigation, the navigation of the electric vehicle 100 searches for the route to the set destination and guides the user.

The set destination may be referenced for battery operation. The ECU 202 determines whether a remaining charge of the battery 252 is sufficient for the electric vehicle 100 to travel from the starting position to the set destination. When the remaining charge of the battery 252 is not sufficient to travel to the destination, the ECU 202 increases the charging speed of the battery 252 so that the battery 252 may be charged to the target charging amount before the scheduled driving time. Also, when the remaining charge of the battery 252 is not sufficient to travel to the destination, the ECU 202 may generate an alarm for notifying the user that the battery 252 is required to be charged to travel to the set destination.

<Setting a Driving Schedule>

Also, the user may set the driving schedule of the electric vehicle 100 through the application installed in the mobile device 402. The driving schedule may include the departure date and the departure time. For example, when the user is scheduled to travel in 30 minutes from the New York Stock Exchange to JFK International Airport, the user may set up the driving schedule on the electric vehicle 100 at the remote site via the mobile device 402. This setting of the driving schedule may be such that, from the viewpoint of the electric vehicle 100, the driving schedule is received from the user's mobile device 402.

Another method may be to receive a driving schedule from a schedule guide service to control the charging of the battery 252. The ECU 202 of the electric vehicle 100 may be provided with the driving schedule from a certain guide service linked to the user's mobile device 402 to control the charging of the battery 252. The schedule guide service may be a calendar service based on wired communication or wireless communication, such as a calendar service provided on an Internet portal or the server 406 of an automobile manufacturer. This setting of the driving schedule may be such that, from the viewpoint of the electric vehicle 100, the driving schedule is obtained directly from the calendar service.

<Setting of Air Conditioner>

The user may set the target temperature of the air conditioner 262 of the electric vehicle 100 through the application installed in the mobile device 402. By setting the target temperature of the air conditioner 262, the air conditioner 262 may be operated in advance to start before the scheduled time of the electric vehicle 100, so that the temperature of the passenger room may reach the set temperature at the scheduled time of the electric vehicle 100. During the winter season, the target temperature may be set higher (for example, 29° C.) in order to raise the internal temperature of the electric vehicle 100. On the contrary, during the summer season, the target temperature may be set lower (for example, 22° C.) in order to lower the internal temperature of the electric vehicle 100. This setting of the target temperature may be such that, from the viewpoint of the electric vehicle 100, the target temperature is received from the user's mobile device 402.

In another method, instead of the target temperature setting by the user, the target temperature may be automatically set in the air conditioner 262 based on the data analysis result. In this case, the ECU 202 of the electric vehicle 100 receives the data analysis result from the database provided in the telematics center 404 or the server 406 of the vehicle manufacturer, and obtains the set target temperature of the air conditioner 262. For example, an average value of a plurality of target temperatures set by the user during a recent period may be automatically set as the target temperature of the air conditioner 262. When the target temperature set by the user in the last week is 29° C., 28° C., 29° C., 27° C. and 27° C., the average value of 28° C. may be automatically set as a new target temperature. Also, when the user is scheduled to travel in 30 minutes from the New York Stock Exchange to JFK International Airport, the average temperature near the New York Stock Exchange at the corresponding time of the past few years may be set to a new target temperature of the air conditioner 262. For convenience of explanation, the expressions of the target temperature, the set temperature, and the air conditioning set temperature may be used in combination.

<Control for Charging the Battery>

As such, when the schedule, the destination, and the air-conditioning set temperature of the electric vehicle 100 are determined, the electric vehicle 100 confirms whether the present charge amount of the battery 252 is sufficient to travel to the destination.

If the remaining charge of the battery 252 is insufficient to travel to the destination at the next scheduled time (that is, the next scheduled driving time) from the current time, the ECU 202 determines that the battery 252 is required to be charged.

The ECU 202 calculates the time that is expected to be required to charge the battery 252 to the target charge amount when the battery 252 is required to be charged. When the current SOC of the battery 252 is 35% and a SOC of 60% is required to travel from the next driving schedule to the destination, the ECU 202 calculates the time required to charge the battery 252 from 35% to 60%.

The ECU 202 also operates the air conditioner 262 while charging the battery 252 so that the internal temperature of the electric vehicle 100 reaches the air-conditioning set temperature. If the estimated time required for charging the battery 252 is 45 minutes and only 30 minutes is left until the next scheduled driving time of the electric vehicle 100, it is impossible to charge the battery 252 to the target charging amount before the scheduled departure time. The ECU 202 adjusts the set temperature of the air conditioner 262 to reduce the operation amount or degree of operation or degree of usage of the air conditioner 262 when the time to charge the battery 252 to the target charge amount is short within a given time. According to this, the power of the battery 252 consumed by the operation of the air conditioner 262 is reduced, so that the battery 252 may be charged faster.

A method of charging a battery of an electric vehicle according to an embodiment of the present disclosure will now be described with reference to FIGS. 5 and 6.

Figure 5:
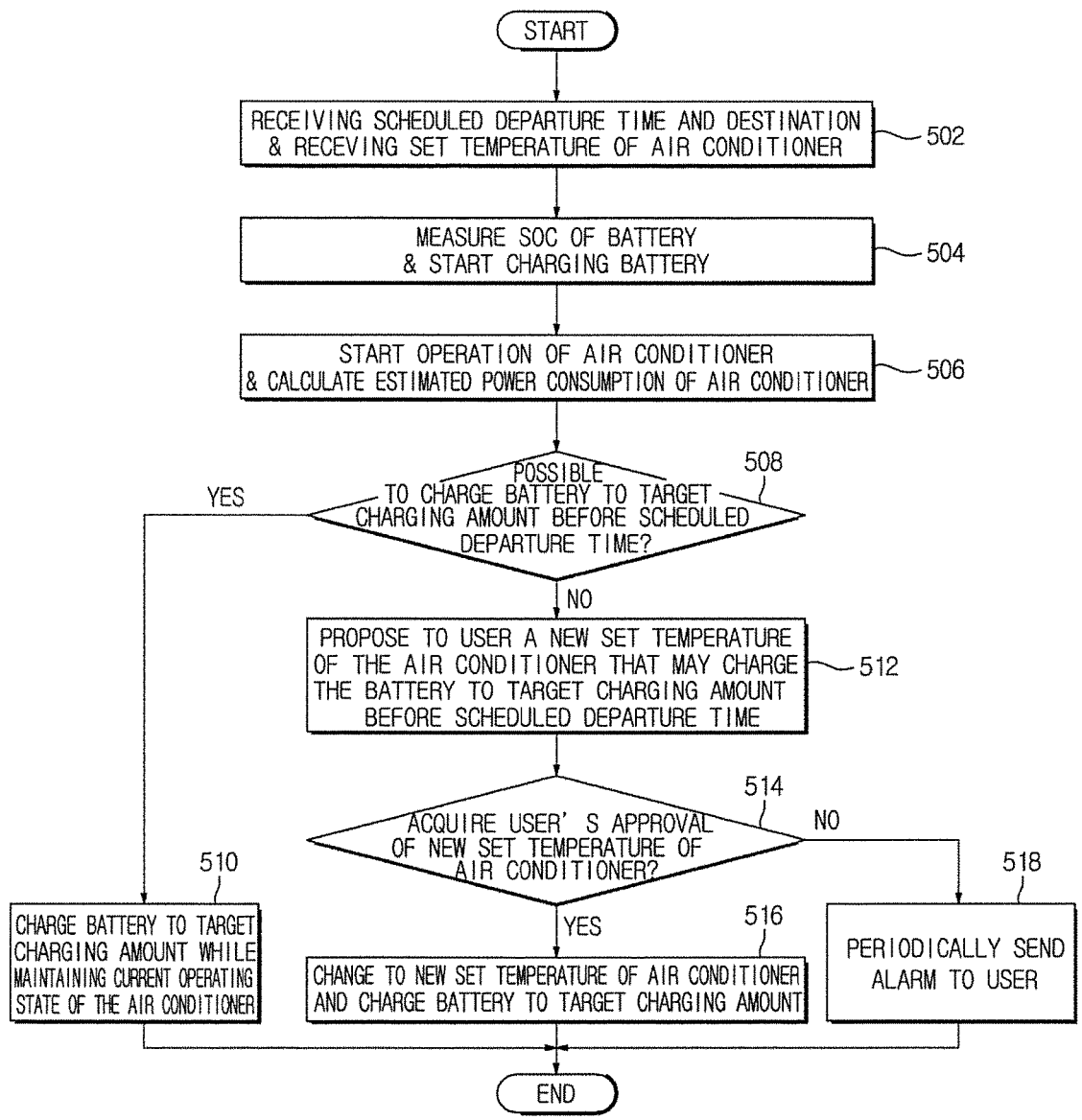
FIG. 5 is a diagram illustrating a battery charging method of an electric vehicle according to a first embodiment of the present disclosure.

FIG. 5 is a diagram illustrating a battery charging method of an electric vehicle according to a first embodiment of the present disclosure. In the battery charging method shown in FIG. 5, the ECU 202 adjusts the set temperature of the air conditioner 262 as required according to the schedule of driving of the electric vehicle 100 and the state of charge (SOC) of the battery 252 to calculate the time required for charging the battery 252 so that the battery 252 may be charged up to the target charging amount within a given time.

The ECU 202 of the electric vehicle 100 receives the information about the next driving schedule and the set temperature of the air conditioner of the electric vehicle 100 (502). For example, the ECU 202 receives information about the scheduled departure time and the destination of the next driving schedule of the electric vehicle 100, and information about the intended air conditioning set temperature of the passenger room at the departure point from the user's mobile device 402. For example, the ECU 202 receives the schedule to drive from the New York Stock Exchange to JFK International Airport at 8 AM, 30 minutes after the present time, and receives information about the air conditioning set temperature (for example, 22) at the departure time (8:00 AM).

The ECU 202 measures the SOC of the battery 252 and starts charging the battery 252 if required since the electric vehicle 100 is scheduled to drive 30 minutes after the present time (504). The measurement of the SOC of the battery 252 is for determining whether the present remaining charge amount of the battery 252 is sufficient to drive to the destination. When the present remaining charge of the battery 252 is not sufficient to drive to the destination, charging the battery 252 to at least reach the destination is required.

In this case, the amount of charge of the battery 252 may be determined depending on whether a charging station exists at the destination. For example, if a charging station exists at the destination, the battery 252 may be charged to a sufficient amount to reach the destination. Therefore, only the required amount of the battery 252 to reach the destination is secured, and the air-conditioning set temperature is kept as is or minimized. In contrast, if a charging station does not exist at the destination, it is preferable to prepare for the case where the battery 252 may not be charged for a long period of time. For this, it is required to charge the battery 252 to 100% before the scheduled departure time, if possible. Therefore, charging the battery 252 to 100% before the scheduled departure time is given the highest priority. If changing the air-conditioning set temperature is required in order to charge the battery 252 to 100% before the scheduled departure time, the user's mobile device 402 may propose changing the air-conditioning set temperature. The change of the air conditioning set temperature is intended to consume less power of the battery 252. Also, the change of the air conditioning set temperature may include setting the air conditioner 262 not to operate at all. If the remaining time until the scheduled departure time is insufficient to charge the battery 252 sufficiently, the air conditioner 262 may be turned off and only the charge of the battery 252 may be performed.

The new set temperature of the air conditioner 262 to propose to the user may be calculated as follows. The total amount of supply power that may be supplied to the battery 252 for charging until the scheduled departure time arrives may be expressed as <total supply power amount=charging power per hour X possible charging time>. The charging power per hour is determined by the charging capability of the charging station, since the charging capability (i.e., the power supplied per unit time) may vary depending on the charging station. The possible charging time may be expressed as <possible charging time=scheduled departure time−current time>. An available supplying amount of power for the operation of the air conditioner 262 may be expressed as <the available supplying amount of power for the air conditioner=the total supplied power amount−the required battery charging amount>. A new set temperature of the air conditioner 262 that can be reached by the scheduled departure time may be calculated from the available supplying amount of power for the air conditioner 262. The ECU 202 may suggest the calculated new set temperature of the air conditioner 262 to the user via the mobile device 402 and guide the user to change the set temperature of the air conditioner 262.

The ECU 202 also starts the operation of the air conditioner 262 and calculates the estimated power consumption of the air conditioner 262 required for making the temperature of the passenger room 22° C. which is the set temperature of the air conditioner 262 (506). The estimated power consumption of the air conditioner 262 may be obtained by finding the difference between the current temperature of the passenger room and the set temperature of the air conditioner 262, and checking the operation amount of the air conditioner 262 required for cooling or heating by the temperature difference from a lookup table prepared in advance.

Also, the ECU 202 confirms whether to charge the battery 252 to the target charging amount before the scheduled departure time while maintaining the current operating state of the air conditioner 262 (508). That is, the ECU 202 determines whether the battery 252 may be charged up to the target charging amount by 8 o'clock, which is the scheduled departure time, when the battery 252 is charged while the air conditioner 262 is operated with the target temperature of the air conditioner 262.

When the air conditioner 262 is operated with the set temperature of the air conditioner 22° C. and the battery 252 may be charged to the target charging amount before the scheduled departure time (Yes in 508), the ECU 202 continues to charge the battery 252 to the target charging amount while maintaining the current operating state of the air conditioner 262 (510). In this case, even if the operating state of the air conditioner 262 is maintained, the battery 252 may be fully charged up to the target charging amount by 8:00, which is the scheduled departure time, so that the charging speed of the battery 252 is not required to be increased. The operation of the air conditioner 262 and the charging of the battery 252 are continued while maintaining the set temperature of the air conditioner 262 as the current set temperature.

In contrast, when the battery 252 may not be charged to the target charging amount before the scheduled departure time (No in 508) while the air conditioner 262 is operating with the set temperature of the air conditioner 262 (22° C.), the ECU 202 proposes to the user a new set temperature of the air conditioner 262 that may reduce the operation amount of the air conditioner 262 and reduce the power consumption (512).

When the battery 252 is charged while maintaining the current operating state of the air conditioner 262, the battery 252 may not be charged up to the target charging amount before the scheduled departure time. Accordingly, the set temperature of the air conditioner 262 is adjusted to reduce the power consumption of the air conditioner 262, thereby shortening the time required for charging the battery 252, and thus the battery 252 may be charged to the target charging amount before the scheduled departure time.

The proposed new set temperature of the air conditioner 262 is transmitted to the user's mobile device 402 via the telematics center 404 or the server 406 of the vehicle manufacturer. The user may determine whether to approve/reject the proposal for adjustment of the new set temperature of the air conditioner 262 to the ECU 202 of the electric vehicle 100 through the mobile device 402.

The ECU 202 of the electric vehicle 100 confirms whether the user approves the adjustment proposal of the new set temperature of the air conditioner 262 (514).

If the user approves the proposed new set temperature of the air conditioner 262 (YES in 514), the ECU 202 of the electric vehicle 100 changes the present set temperature of the air conditioner 262 to the new set temperature of the air conditioner 262, and charging of the battery 252 is continued while the operation of the air conditioner 262 continues (516). For example, when the user approves the proposal of changing the set temperature of the air conditioner 262 from the existing temperature of 22° C. to the new temperature of 26° C., the ECU 202 sets the new set temperature of the air conditioner 262 to 22° C. and then continues to charge the battery 252 while the air conditioner 262 is operating.

If the set temperature of the air conditioner 262 is adjusted from the lower temperature of 22° C. to the relatively higher temperature of 26° C., the cooling operation time of the air conditioner 262 is shortened, and thus the power consumption by the air conditioner 262 also decreases. The decrease in the power consumption by the air conditioner 262 means that the amount of power consumed by the air conditioner 262 from the battery 252 is reduced so that the time required for charging the battery 252 to the target charging amount is also shortened. Due to the shortening of the charging time of the battery 252, the battery 252 may be sufficiently charged to the target charging amount before the scheduled departure time of the electric vehicle 100.

In contrast, if the user does not approve the setting of the new set temperature of the air conditioner 262 (NO in 514), the ECU 202 of the electric vehicle 100 periodically sends an alarm to the user's mobile device 402 (518). That is, if the set temperature of the air conditioner 262 is not adjusted, the user's mobile device 402 is notified periodically that the battery 252 may not be charged to the target charging amount before the scheduled departure time, and notifies the user's attention by periodically notifying the user through the mobile device 402. The transmission of periodic alarms is made via the telematics center 404 or the server 406 of the vehicle manufacturer.

Figure 6:
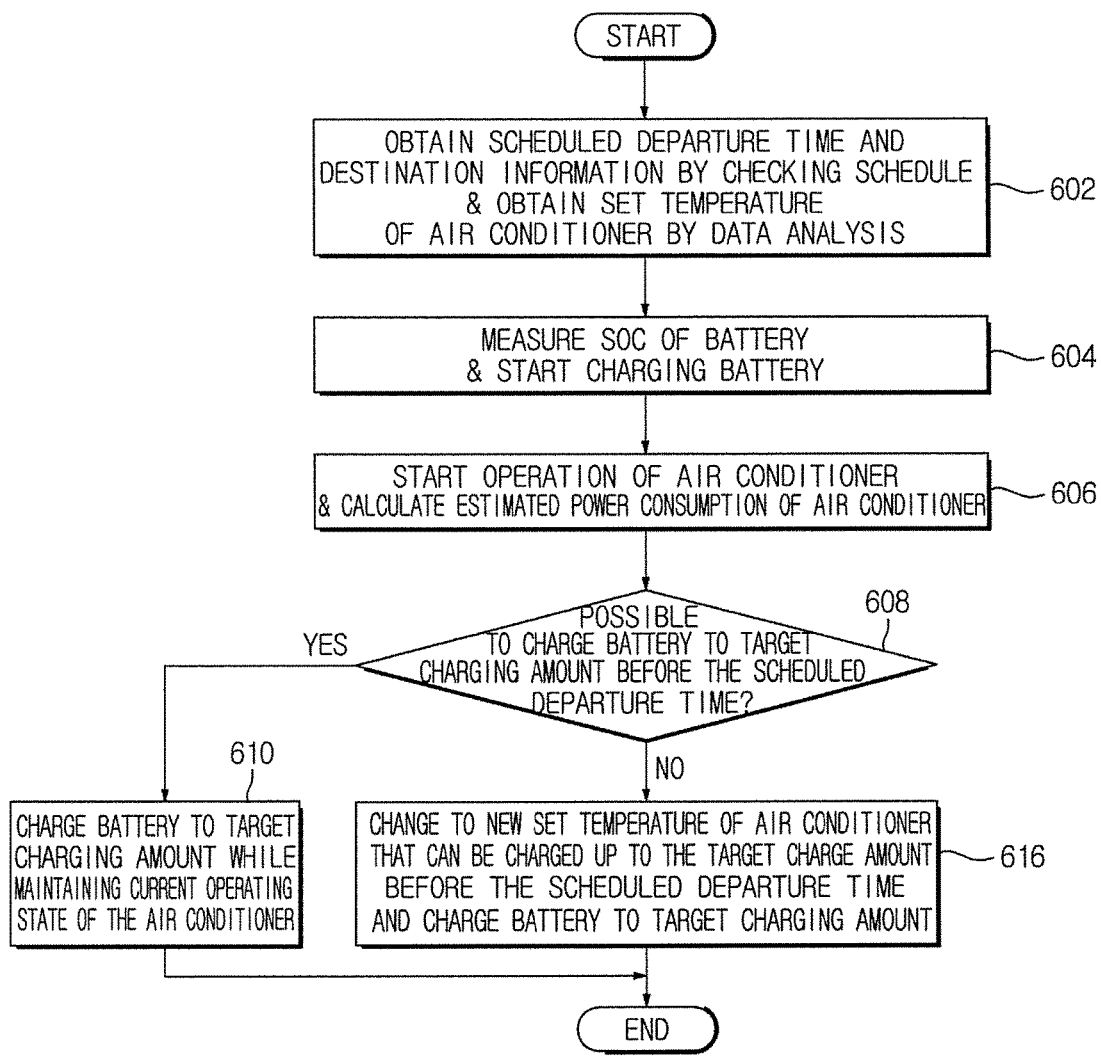
FIG. 6 is a diagram illustrating a battery charging method of an electric vehicle according to a second embodiment of the present disclosure.

FIG. 6 is a diagram illustrating a battery charging method of an electric vehicle according to a second embodiment of the present disclosure. In the battery charging method shown in FIG. 6, the ECU 202 acquires a schedule of the electric vehicle 100 and a set temperature of the air conditioner 262 from the calendar service or database (not directly from the user). The ECU 202 controls the charging of the battery 252 and the operation of the air conditioner 262 on the basis of the obtained schedule of the electric vehicle 100 and the set temperature of the air conditioner 262, and adjusts the set temperature of the air conditioner 262 as required according to the charging state (SOC) of the battery 252 thereby shortening the time required for charging the battery 252 so that the battery 252 may be charged up to the target charging amount within a given time. Particularly, in the control method of FIG. 6, the ECU 202 acquires and analyzes data without the user's intervention in acquiring the driving schedule of the electric vehicle 100 and the set temperature of the air conditioner 262, adjusts the set temperature of the air conditioner 262, and performs the required control such as adjustment of the set temperature of the air conditioner 262.

The ECU 202 of the electric vehicle 100 obtains information of the next driving schedule of the electric vehicle 100 from the calendar service, and also obtains information of the set temperature of the air conditioner 262 by analyzing data related to the set temperature of the air conditioner 262 (602). That is, the ECU 202 is provided with the schedule of the electric vehicle 100 from an Internet-based calendar service, such as a calendar service of an Internet portal or the server 406 of the vehicle manufacturer, to which the user's mobile device 402 is linked, and obtains information of a scheduled departure time and a destination of the next driving schedule of the electric vehicle 100. For example, 30 minutes after the present time, at 8:00 AM, the travel information from the New York Stock Exchange to JFK International Airport is obtained through the calendar service.

Further, in setting a target temperature of the air conditioner 262, if the user does not set the specific target temperature of the air conditioner 262 but instead sets an appropriate target temperature of the air conditioner 262, the ECU 202 may receive data from the telematics center 404 or the server 406 of the vehicle manufacturer and automatically set the target temperature of the air conditioner 262 based on the received data.

In one embodiment, the average value of various target temperatures set by the user in the air conditioner 262 during a recent period may be set as a new target temperature of the air conditioner 262. For example, when the set temperature of the air conditioner 262 set by the user for the last week is 29° C., 28° C., 29° C., 27° C., and 27° C., the average value of 28° C. can be set as the new set temperature of the air conditioner 262.

As another example, when the next schedule is to drive from the New York Stock Exchange to JFK International Airport 30 minutes later, the ECU 202 may set a temperature obtained by adding a constant temperature to the average temperature around the New York Stock Exchange at the corresponding time of the past few years as a new air conditioning temperature.

The ECU 202 measures the SOC of the battery 252 and starts charging the battery 252 if required since the electric vehicle 100 is scheduled to drive 30 minutes after the present time (604). The measurement of the SOC of the battery 252 is for determining whether the present remaining charge amount of the battery 252 is sufficient to drive to the destination. When the present remaining charge of the battery 252 is not sufficient to drive to the destination, charging the battery 252 to at least reach the destination is required.

In this case, the amount of charge of the battery 252 may be determined depending on whether a charging station exists at the destination. For example, if a charging station exists at the destination, the battery 252 may be charged to a sufficient amount to reach the destination. Therefore, only the required amount of the battery 252 to reach the destination is secured, and the air-conditioning set temperature is kept as is or minimized. In contrast, if a charging station does not exist at the destination, it is preferable to prepare for the case where the battery 252 may not be charged for a long period of time. For this, it is required to charge the battery 252 to 100% before the scheduled departure time, if possible. Therefore, charging the battery 252 to 100% before the scheduled departure time is given the highest priority. If changing the air-conditioning set temperature is required in order to charge the battery 252 to 100% before the scheduled departure time, the user's mobile device 402 may propose changing the air-conditioning set temperature. The change of the air conditioning set temperature is intended to consume less power of the battery 252. Also, the change of the air conditioning set temperature may include setting the air conditioner 262 not to operate at all. If the remaining time until the scheduled departure time is insufficient to charge the battery 252 sufficiently, the air conditioner 262 may be turned off and only the charge of the battery 252 may be performed.

The new set temperature of the air conditioner 262 to propose to the user may be calculated as follows. The total amount of supply power that may be supplied to the battery 252 for charging until the scheduled departure time arrives may be expressed as <total supply power amount=charging power per hour X possible charging time>. The charging power per hour is determined by the charging capability of the charging station, since the charging capability (i.e., the power supplied per unit time) may vary depending on the charging station. The possible charging time may be expressed as <possible charging time=scheduled departure time−current time>. An available supplying amount of power for the operation of the air conditioner 262 may be expressed as <the available supplying amount of power for the air conditioner=the total supplied power amount−the required battery charging amount>. A new set temperature of the air conditioner 262 that can be reached by the scheduled departure time may be calculated from the available supplying amount of power for the air conditioner 262. The ECU 202 may suggest the calculated new set temperature of the air conditioner 262 to the user via the mobile device 402 and guide the user to change the set temperature of the air conditioner 262.

The ECU 202 also starts the operation of the air conditioner 262 and calculates the estimated power consumption of the air conditioner 262 required for making the temperature of the passenger room 22° C. which is the set temperature of the air conditioner 262 (606). The estimated power consumption of the air conditioner 262 may be obtained by finding the difference between the current temperature of the passenger room and the set temperature of the air conditioner 262, and checking the operation amount of the air conditioner 262 required for cooling or heating by the temperature difference from a lookup table prepared in advance.

Also, the ECU 202 confirms whether to charge the battery 252 to the target charging amount before the scheduled departure time while maintaining the current operating state of the air conditioner 262 (608). That is, the ECU 202 determines whether the battery 252 may be charged up to the target charging amount by 8 o'clock, which is the scheduled departure time, when the battery 252 is charged while the air conditioner 262 is operated with the target temperature of the air conditioner 262.

When the air conditioner 262 is operated with the set temperature of the air conditioner 262 (22° C.) and the battery 252 may be charged to the target charging amount before the scheduled departure time (Yes in 608), the ECU 202 continues to charge the battery 252 to the target charging amount while maintaining the current operating state of the air conditioner 262 (610). In this case, even if the operating state of the air conditioner 262 is maintained, the battery 252 may be fully charged up to the target charging amount by 8:00, which is the scheduled departure time, so that the charging speed of the battery 252 is not required to be increased. The operation of the air conditioner 262 and the charging of the battery 252 are continued while maintaining the set temperature of the air conditioner 262 as the current set temperature.

In contrast, when the battery 252 may not be charged to the target charging amount before the scheduled departure time (No in 608) while the air conditioner 262 is operating with the set temperature of the air conditioner 262 (22° C.), the ECU 202 proposes to the user a new set temperature of the air conditioner 262 that may reduce the operation amount of the air conditioner 262 and reduce the power consumption (612).

If the set temperature of the air conditioner 262 is adjusted from the lower temperature of 22° C. to the relatively higher temperature of 26° C., the cooling operation time of the air conditioner 262 is shortened, and thus the power consumption by the air conditioner 262 also decreases. The decrease in the power consumption by the air conditioner 262 means that the amount of power consumed by the air conditioner 262 from the battery 252 is reduced so that the time required for charging the battery 252 to the target charging amount is also shortened. Due to the shortening of the charging time of the battery 252, the battery 252 may be sufficiently charged to the target charging amount before the scheduled departure time of the electric vehicle 100.

It is to be understood that the above description is only illustrative of technical ideas, and various modifications, alterations, and substitutions are possible without departing from the essential characteristics of the present disclosure. Therefore, the embodiments and the accompanying drawings described above are intended to illustrate and not limit the technical idea, and the scope of technical thought is not limited by these embodiments and accompanying drawings. The scope of which is to be construed in accordance with the following claims, and all technical ideas which are within the scope of the same should be interpreted as being included in the scope of the right.

What is claimed is:

1. A method of charging a battery of a vehicle, comprising:
    starting charging of the battery;
    starting operation of an air conditioner using power supplied from the battery; and
    reducing an operation amount of the air conditioner while charging the battery and operating the air conditioner, thereby shortening the time required for charging the battery,
    wherein the battery is charged up to a target charge amount required for the vehicle to travel to a destination.

2. The method according to claim 1, wherein the charging of the battery and the operation of the air conditioner are performed in response to a charging command and an air conditioning operation command that occurs before a scheduled driving time of the vehicle.

3. A method of charging a battery of a vehicle, comprising:
    starting charging of the battery;
    starting operation of an air conditioner using power supplied from the battery; and
    reducing an operation amount of the air conditioner while charging the battery and operating the air conditioner, thereby shortening the time required for charging the battery,
    wherein the operation amount of the air conditioner is reduced by adjustment of a set temperature of the air conditioner.

4. The method according to claim 3, wherein the adjustment of the set temperature of the air conditioner comprises:
    calculating a possible charging time from a difference between a scheduled departure time and a current time;
    calculating a total amount of supplying power from a product of a charge power per hour and the possible charging time;
    calculating an amount of available supply power for the air conditioner from a difference between the total amount of supplying power and a required battery charging amount; and
    calculating a new set temperature of the air conditioner capable of charging the battery before the scheduled departure time, wherein the new set temperature of the air conditioner is calculated from the amount of available supply power.

5. A vehicle, comprising:
    a battery;
    an air conditioner operated by power supplied from the battery; and
    a controller reducing an operation amount of the air conditioner while charging the battery and operating the air conditioner, thereby shortening the time required for charging the battery,
    wherein the battery is charged up to a target charge amount required for the vehicle to travel to a destination.

6. The vehicle according to claim 5, wherein the charging of the battery and the operation of the air conditioner are performed in response to a charging command and an air conditioning operation command that occurs before a scheduled driving time of the vehicle.

7. A vehicle, comprising:
    a battery;
    an air conditioner operated by power supplied from the battery; and
    a controller reducing an operation amount of the air conditioner while charging the battery and operating the air conditioner, thereby shortening the time required for charging the battery,
    wherein the operation amount of the air conditioner is reduced by adjustment of a set temperature of the air conditioner.

8. The vehicle according to claim 7, wherein the controller is configured to:
    calculate a possible charging time from a difference between a scheduled departure time and a current time;
    calculate a total amount of supplying power from a product of a charge power per hour and the possible charging time;
    calculate an amount of available supply power for the air conditioner from a difference between the total amount of supplying power and a required battery charging amount;
    calculate a new set temperature of the air conditioner capable of charging the battery before the scheduled departure time, wherein the new set temperature of the air conditioner is calculated from the amount of available supply power; and
    adjust the set temperature of the air conditioner based on the new set temperature of the air conditioner.

9. A method of charging a battery of a vehicle, comprising:
    receiving a scheduled driving time and a destination of the vehicle, and a set temperature of the air conditioner;
    displaying a present charge amount of the battery and the set temperature of the air conditioner on a display;
    displaying a new set temperature of the air conditioner on the display, wherein the new set temperature of the air conditioner is for charging the battery up to a target amount of charge required for the vehicle to travel to the destination before the scheduled driving time of the vehicle during charging of the battery and operation of the air conditioner, thereby shortening the time required for charging the battery, and controlling the charging of the battery so that the battery is charged to the target charging amount before the scheduled driving time of the vehicle while operating the air conditioner to follow the new set temperature of the air conditioner displayed on the display.

10. The method according to claim 9, wherein the scheduled driving time and destination of the vehicle and the set temperature of the air conditioner are set by a user of the vehicle through a mobile device.

11. The method according to claim 9, wherein the scheduled driving time and destination of the vehicle are received from a schedule guidance service based on wired communication or wireless communication.

12. The vehicle according to claim 9, wherein the set temperature of the air conditioner is acquired by analyzing the use history of the air conditioner.

13. The method according to claim 9, wherein the set temperature of the air conditioner is acquired by analyzing the weather history of a departure area of the vehicle.

14. The vehicle according to claim 9, wherein the battery is charged up to a target charge amount necessary for the vehicle to travel to a destination.

15. The vehicle according to claim 9, wherein the charging of the battery and the operation of the air conditioner are performed in response to a charging command and an air conditioning operation command that occurs before the scheduled driving time of the vehicle.

16. The method according to claim 9, further comprising obtaining approval from a user of the vehicle to change the set temperature of the air conditioner to the new set temperature of the air conditioner.

17. The method according to claim 16, further comprising generating an alarm to inform the user that the amount of charge of the battery may be insufficient, when the user's approval for changing the new set temperature of the air conditioner is not obtained.

* * * * *